Dec. 26, 1967  F. G. WEIS ETAL  3,360,002
AUTOMATIC LIQUID LEVEL CONTROL MEANS FOR A SEWERAGE WET WELL
Filed Feb. 15, 1965
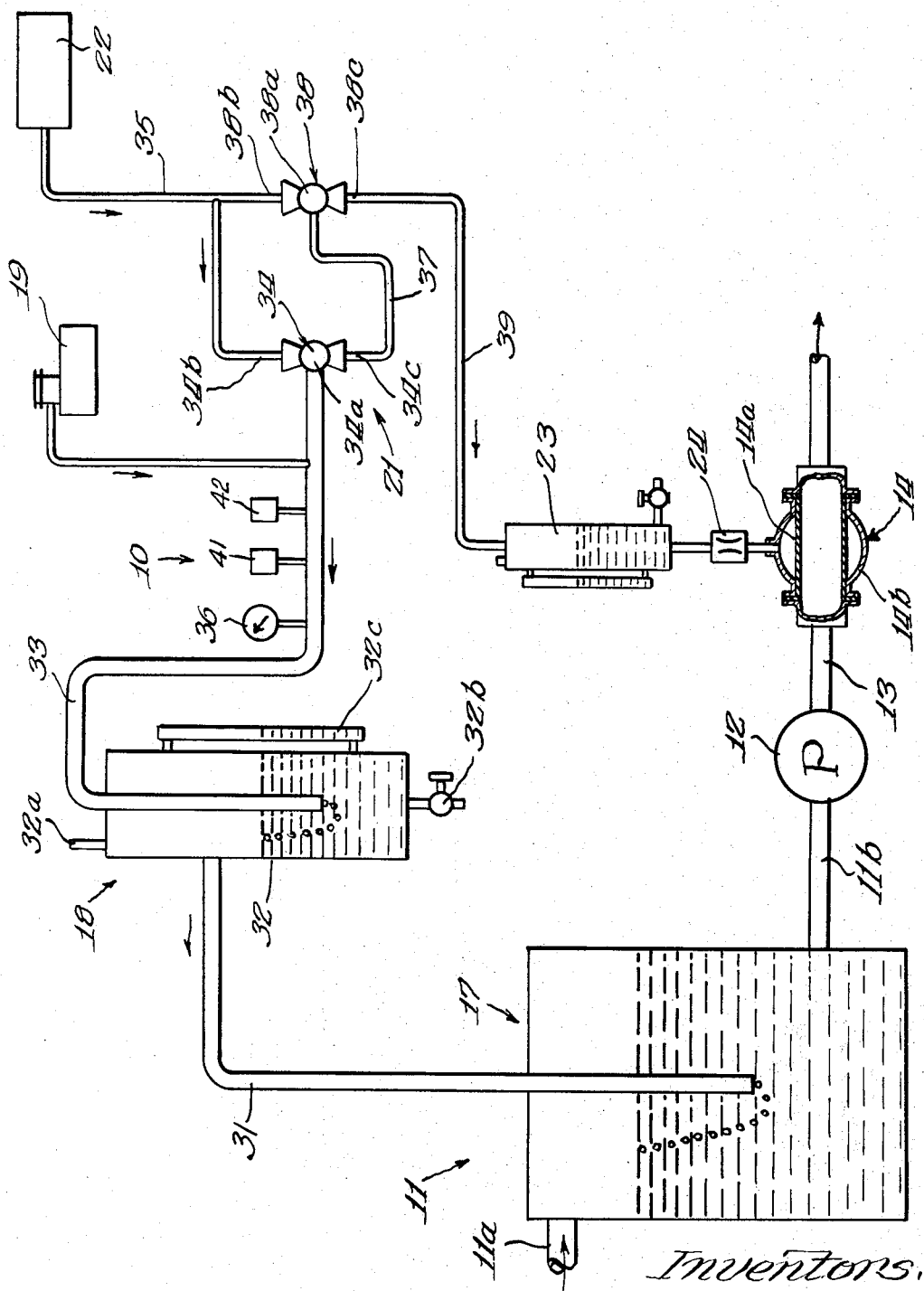
Inventors:
Frank G. Weis
Charles R. Welty
By Hume, Groen, Clement & Hume Attys – # United States Patent Office 3,360,002
Patented Dec. 26, 1967

3,360,002
AUTOMATIC LIQUID LEVEL CONTROL MEANS
FOR A SEWERAGE WET WELL
Frank G. Weis, Kansas City, Mo., and Charles R. Welty, Shawnee Mission, Kans., assignors to Union Tank Car Company, Chicago, Ill., a corporation of New Jersey
Filed Feb. 15, 1965, Ser. No. 432,751
8 Claims. (Cl. 137—395)

ABSTRACT OF THE DISCLOSURE

A sewage handling system comprises a sewage wet well having an inlet and a flexible conduit valve coupled to a discharge outlet for establishing a flow orifice of a cross-section inversely related to an applied pressure. A signal developing device, coupled to an air compressor, is arranged to provide a pressure indication proportional to the fluid depth in the wet well. This pressure signal is coupled to a control circuit including an air reversing pressure boosting relay and a volume boosting relay coupled to the output of the reversing relay; a device coupled to the second relay applies a pressure to the flexible valve to effect a continuous variation in the discharge flow rate from the wet well in proportion to the fluid depth therein. The use of a closed control reservoir and a second bubbler conduit in series with the first bubbler for adjusting the nominal flow rate at a given depth in the wet well is also disclosed.

---

This invention relates to a liquid flow control means and more particularly to a means for controlling the flow of liquid from a sewage reservoir tank or so called "wet well," so as to maintain uniform liquid level within the tank.

It is an object of the invention to provide means for effectively controlling the flow of liquid from a sewage reservoir tank or so-called "wet well."

Still another object of the invention is to provide means for controlling the flow rate of fluid from a sewage reservoir so that this flow rate is maintained in preselected relationship to the rate of flow of material into the reservoir.

A further object of the present invention is to provide a liquid flow control means that responds to variations in the level of material accumulated in a sewage reservoir so as to adjust the flow rate of material from the reservoir and thereby compensate for such level variations.

A more specific object of the present invention is to provide a liquid flow control means which is selectively adjustable to vary the operating flow rate characteristics of the sewage system controlled thereby in a reliable and efficient manner.

An additional object of the present invention is to provide a liquid flow control means which is highly sensitive, quickly responsive and extremely effective in maintaining the rate of flow of liquid from a sewage reservoir so that this flow rate complements the flow rate of material to the reservoir, notwithstanding temporary and transient surges in this "in-flow" rate.

Other objects and advantages of the present invention will become apparent from the following detailed description of one preferred embodiment thereof, particularly when considered in conjunction with the accompanying drawing wherein the single figure diagrammatically represents a preferred embodiment of the liquid flow control means.

The present invention is directed to an improved form of liquid flow control means that is employed to reliably effect the maintenance of a controlled rate of flow of liquid from a sewage reservoir tank, hereinafter referred to as a "wet well." The control means preferably employs a pair of air bubblers. One of the bubblers is associated with the wet well itself and functions as a coarse control sensing unit while the other is utilized in conjunction with a closed auxiliary reservoir and serves as an adjustable fine control sensing unit. The air bubblers cooperatively function to supply a pressure signal to a pressure responsive means that in turn controls the actuation of a throttling valve located in the output line of the sewage reservoir.

In response to fluctuations in the "wet well" liquid level (i.e., due to variations in the rate of flow of liquid to the "wet wall"), the pressure signal supplied by the dual bubblers also varies. As a result of the variations in the magnitude of this pressure signal, the throttling valve is adjusted to accommodate either a higher or lower liquid flow rate from the "wet well." If the variations in the rate of flow of material to the "wet well" raises the level of liquid within the well, the air bubblers respond and provide an increased pressure signal and the throttling valve is actuated to allow a higher rate of flow of liquid from the well. Conversely, when the "in-flow" rate decreases and the liquid level in the well lowers, the throttling valve is actuated to decrease the rate of flow of liquid from the well.

As hereinafter described in detail, the dual bubbler arrangement in the control means facilitates making adjustments in the responsive characteristics of the control means so that the operation of the system can be selectively varied in a reliable and efficient manner. In addition, the liquid flow control means of the present invention is highly sensitive and rapidly responsive to liquid level variations in the well so that compensating adjustments in the output flow rate are quickly and accurately effected.

Referring more specifically to the drawing, the control means, which is generally designated by the numeral 10, is shown when employed with a portion of a sewage handling system including an open top cylindrical reservoir tank or "wet well" 11. The open top "wet well" 11 is diagrammatically represented as having an inlet flow pipe 11a and an outlet flow pipe 11b connected, respectively, to inlet and outlet orifices that are formed in the tank walls. In a conventional manner, the outlet flow pipe 11b is coupled to a constant speed centrifugal sewage pump 12. The pump 12 is utilized to effect the pumping of liquid from the wet well 11 and supply the liquid to an outlet line 13 and through a throttling valve 14 that is connected in the outlet line.

In a preferred embodiment of the invention the throttling valve 14, which is actuated by the liquid flow control means 10, is of the type disclosed in United States Letters Patent No. 2,972,464. In this connection, the valve 14 preferably includes an inner flexible rubber liner 14a that defines a sewage passageway communicating with and forming a continuation of the outlet pipe 13. This inner liner is confined within a rigid outer housing 14b. The valve 14 is selectively opened and closed in response to the application of suitable pressure to the resilient sleeve. The applied, valve operating pressure, which in the illustrated embodiment is hydraulic pressure, is developed in the annular space defined between the outer surface of the resilient liner 14a and the surrounding valve housing 14b.

Before proceeding with a detailed description of the individual components that comprise the liquid flow control means 10, it is well to understand that the control means includes two main cooperative units and to appreciate the general manner in which these units operatively complement one another. In this connection, the first of these two main units is the level sensing portion of the control means. The level sensing portion is comprised of a pair of interconnected air bubblers 17 and 18, an air bubbler compressor 19 and a pressure responsive relay means 21. The other unit is the valve actuating portion of the control means that operates the throttling valve 14. The valve actuating portion includes an air compressor 22, a hydro-pneumatic transducer 23, and a fixed orifice defining member 24. The output from the air compressor 22 is connected to the transducer 23 by the relay means 21. These two units and the components that comprise these units co-act to insure that fluctuations in the "wet well" liquid level are quickly and reliably sensed and that compensating variations are effected in the condition of the throttling valve 14 to adjust the rate of flow of liquid out of the vessel.

As shown, the coarse air bubbler 17 comprises an air supply conduit 31 that extends through the open top of and into the "wet well" 11 so that the open end thereof is located at a position below the anticipated normal level of liquid within the well. The other end of the conduit 31 extends from and is connected to the wall portion of a closed auxiliary liquid reservoir 32 at a location above the anticipated highest level of liquid within the reservoir. The reservoir 32 is preferably a conventional bubbler and is illustrated as a closed vessel having an upper inlet line 32a that is utilized to selectively supply additional liquid to the reservoir for the purpose hereinafter more fully described. The reservoir 32 is also provided with a lower outlet valve 32b that is used to selectively effect the discharge of an amount of liquid from the tank. A conventional sight gauge 32c is also associated with the reservoir 32.

An air supply conduit or bubbler pipe 33 is secured in air tight relation to and extends through the top wall portion of the closed vessel forming the reservoir 32 so that the lower open end of this air supply conduit is located below the level of the liquid medium confined within the tank. The air supply conduit 33 is connected to a conventional air bubbler compressor 19, which is preferably of the diaphragm type, and is also connected to the relay means 21. More specifically, the conduit 33 is connected to the signal port 34a of a conventional air reversing pressure boosting air relay 34, which is one of the two interconnected air relays forming the relay means 21. A pressure gauge 36, a low level pressure switch 41, and a high level pressure switch 42 are also preferably connected to the air supply conduit 33 so that the pressure condition existing in the conduit 33 is sensed by these elements.

When the air bubbler compressor 19 supplies air to the air supply and bubbler conduit 33, this air is delivered through the open end of the conduit and passes to the upper portion of reservoir 32 through and against the head of liquid confined therein. The air exhausted from the open end of the conduit 33, through the liquid and into the upper portion of the reservoir 32 is similarly fed through the bubbler conduit 31 and exhausted through and against the head of liquid accumulated in the "wet well" 11. The pressure necessary to discharge the supplied air through the bubblers 17 and 18 is developed in the conduit 33 and is recorded on the gauge 36. This developed pressure, which is dictated by the liquid levels in the reservoir 32 and "wet well" 11 is also supplied to the signal orifice 34a of the air relay 34.

The inlet orifice 34b for the air relay 34 is connected to an outlet conduit 35 of the air compressor 22, and the outlet orifice 34c of this air relay is coupled by means of a conduit 37 to the signal orifice 38a of a conventional, volume boosting air relay 38. The inlet orifice 38b for the volume boosting air relay 38 is also connected to the conduit 35, and the outlet orifice 38c of this air relay is coupled by means of a conduit 39 to the transducer 23.

In a conventional manner, the air reversing relay 34 functions to boost or amplify the pressure supplied to the signal orifice 34a. Since this pressure is the "wet well" pressure developed in the conduit 33, the amplified signal pressure that is coupled to the signal orifice of the air relay 38 by the conduit 37 is indicative of the level of liquid in the "wet well." Accordingly, as the liquid level rises in the "wet well," the amplified signal pressure is proportionally reduced due to the action of the relay 34, and this signal pressure is proportionally increased when the "wet well" liquid level is lowered.

The air relay 38 responds to the amplified signal pressure by producing an exact reproduction of this signal pressure with a high volume of flow. As previously stated, relays 34 and 38 are conventional and may, for example, respectively constitute a "Kendall Model 25" reversing relay and a "Kendall Model 20" volume booster relay available from the Industrial Products Division of the Fairchild Hiller Corporation under the foregoing trade designations. The output pressure from the relay 38 is supplied from the orifice 38c and fed to the hydro-pneumatic transducer 23. This conventional form of transducer 23 translates the pneumatic signal pressure into a pressurized hydraulic fluid that is supplied at a regulated rate by the fixed orifice 24 to the throttling valve 14.

Assuming the system and control means to be in a normal or quiescent state of operation, the pump 12 operates at constant speed to supply liquid from the wet well 11 to the outlet pipe 13. When in this normal state of operation the control means results in the throttling valve being hydraulically actuated to define an orifice of a size such that the flow rate of liquid from the vessel corresponds to the "in-flow" rate. The size of the orifice, which is defined by the inner liner 14a of the throttling valve 14, will remain constant as will the "wet well" liquid level until the liquid flow rate to the "wet well" changes.

In response to an increase in the rate of flow of material to the wet well, the liquid level therein will rise, it being understood that the "wet well" accommodates a substantial volume and that level variations generally occur rather gradually. As the liquid level rises, the pressure developed in the air supply conduit 33 is increased to the extent necessary to effect the discharge of air through and against the greater head developing in the wet well. Sensing this greater signal pressure in the conduit 33, the air reversing and pressure boosting air relay 34 supplies amplified signal pressure of proportionally reduced magnitude to the signal orifice 38a of the air relay 38, and a lower signal pressure is accordingly supplied to the transducer 23. When the lower signal pressure is translated to hydraulic pressure and supplied through the fixed orifice 24, the inner liner 14a responds to this decreased hydraulic pressure and the defined orifice becomes larger to accommodate an increased rate of liquid flow rate from the "wet well." A decrease in the liquid flow rate to the "wet well" is similarly sensed by the air relay means 21 and a proportionally increased signal pressure is coupled to the hydro-pneumatic transducer 23. Accordingly, a readjustment in the size of the orifice defined by the inner liner of the throttling valve occurs and the rate of liquid flow from the "wet well" is diminished. In either case the liquid level within the "wet well" is maintained fairly constant in response to the compensating variations that the control means effects in the condition of the throttling valve.

From the foregoing, it will be appreciated that the control means 10 is highly sensitive and rapidly responds to variations in the height of liquid accumulated in the wet well due to changes in the liquid "in-flow" rate. By employing the interconnected air reversing, pressure boosting air relay 34 and volume boosting air relay 38, the control means 10 yields adjusted signal pressure in rapid response to and to compensate for such variations.

The air bubbler 18 in the auxiliary reservoir 32 allows the operating characteristics of the control means 10 to be quickly and reliably adjusted in response to anticipated variations in the characteristics of the material handled by the sewage system with which the control means is utilized. For example, when it is anticipated that the density or some other characteristic of the liquid supplied to the wet well will differ from that of the liquid previously supplied thereto, more fluid is supplied to the reservoir through the inlet line 32a. Because of the added pressure head that results from the addition of liquid to the reservoir 32, the same normal liquid level is maintained in the wet well 11 and the same signal pressure is developed in the conduit 33. Obviously, other variations in the characteristics of the system can be compensated for by merely adjusting the quantity of liquid confined within the reservoir 32. In this connection, it is preferable that the reservoir be filled with oil or similar liquid that is not readily susceptible to evaporation.

As previously described, the control means 10 preferably incorporates a low level pressure switch 41 and a high level pressure switch 42 that are connected in the conduit 33 to sense the developed signal pressure. In a fully automatic system, it will be appreciated that these pressure switches are utilized to initiate and/or cut off the pump when the liquid level within the "wet well" and/or the operation of the throttling valve so dictate. For example, when liquid is initially supplied to the wet well, the pump 12 is preferably not operative. However, as the liquid level rises above a preselected level, the pressure switch 42 is utilized to initiate the operation of the pump 12. Should the liquid level thereafter drop below a preset minimum level, the presure switch 41 is employed to deactuate the pump 12 until the "wet well" liquid level again rises sufficiently. Obviously, the numerous other specific functions to which these and/or other pump controls and pressure responsive devices might be put will depend on the particular sewage system involved.

Although the foregoing description is directed to a system wherein only a single constant speed centrifugal pump 12 is employed, it will be appreciated that two or more parallelly arranged pumps might be utilized in the outlet conduit 13, and, more specifically, in a plurality of branches of the outlet conduit. In certain systems it is preferable to use such a plurality of pumps, with their operation being automatically controlled so that the pumps are alternately and/or successively rendered effective for pre-set periods of time. It will be also be appreciated by those skilled in the art that a system of the type depicted in the drawing typically includes various check valves, gate valves and other conventional components that do not form a part of the invention and, therefore, have not been described.

From the foregoing it will be understood that the present invention provides a reliable, highly sensitive and rapidly responsive control means for a sewage handling system. Such a control means provides the advantage of insuring a rapid turnover of sewage from the wet well so that problems due to odor are eliminated. In addition, because the control means is highly sensitive and rapidly responsive, a preselected wet well liquid level is maintainable within fairly close tolerances so that the physical size of the wet well can be reduced. By incorporating the auxiliary reservoir and the additional bubbler that is associated therewith, the control means readily accommodates adjustments in system operation in anticipation of variations in the characteristics of the liquid to be handled by the system. Among other things, this latter characteristic eliminates the necessity of changing the operating characteristics of the pump and other system components.

Because the previous description is merely illustrative of one preferred embodiment of the invention, it will be appreciated that modifications of this embodiment might be devised without departing from the invention, various features of which are set forth in the accompanying claims.

What is claimed is:

1. A sewage handling system which comprises the combination of a sewage wet well having an inlet and a discharge outlet;
    a flexible conduit valve coupled to said discharge outlet for defining a fluid flow orifice of a cross-section inversely proportional to an applied pressure;
    air compressor means;
    signal developing means coupled to said compressor means for developing an air pressure proportional to the fluid depth in said wet well;
    air reversing pressure boosting relay means having input, output and control ports, for translating an input port pressure to said output port in a magnitude inversely proportional to a control pressure applied to said control port;
    volume boosting relay means having input, output and control ports for translating an input port pressure to said output port in a magnitude proportional to a control pressure applied to said control port;
    means for coupling said input ports of both of said relay means to said air compressor means;
    means for coupling said control port and said output port of said reversing relay means to respectively said signal developing means and said control port of said second relay means;
    and means for coupling the output of said second relay means to said flexible conduit valve for effecting a continuous variation in the discharge flow rate from said conduit valve in proportion to the fluid depth in said wet well.

2. The combination according to claim 1 in which said signal developing means includes a first air bubbler conduit disposed in said wet well and said coupling means includes a pneumatic to hydraulic transducer.

3. The combination according to claim 2 in which said signal developing means further includes a closed fluid containing reservoir for receiving an adjustable depth of fluid therein, means for coupling said first bubbler conduit to said closed reservoir, and a second air bubbler conduit disposed within said closed reservoir and coupled directly to said air compressor means for effecting a variation in the nominal rate of flow from said wet well for a given fluid depth therein in correspondence to a change in fluid depth in said closed reservoir.

4. In a sewage handling system of the type comprising a sewage wet well with an inlet and a discharge outlet, valving means coupled to said discharge outlet for controlling the discharge flow rate in proportion to an applied pressure signal and a pneumatic pressure source, the combination comprising:
    a first bubbler conduit disposed in said wet well;
    a closed fluid containing reservoir coupled in series with said first bubbler conduit;
    a second bubbler conduit disposed in said closed reservoir and coupled to said pneumatic pressure source for developing a pneumatic pressure in said second conduit proportional to the liquid depth within both said closed reservoir and said wet well;
    signal translating means responsive to said developed pressure in said second conduit for applying a proportional pressure signal to said valving means;
    and means for adjustably setting the liquid level within said closed reservoir to establish a controlled nominal rate of flow through said valving means for a given depth of liquid within said wet well.

5. The combination according to claim 4 in which said signal translating means comprises a pair of interconnected air relays coupled between said second conduit and said valving means for amplifying and transmitting said developed pressure to said valving means.

6. The combination according to claim 5 in which said relays constitute an air reversing pressure boosting relay and a volume boosting relay and in which both of said relays have input, output and control ports, with said input, output and control ports of said reversing relay coupled respectively to said pneumatic pressure source, said control port of said volume boosting relay and said second conduit and in which said input and output ports of said volume boosting relay are coupled respectively to said pneumatic pressure source and said valving means.

7. The combination according to claim 6 and further including a pneumatic to hydraulic transducer coupled between said output port of said volume boosting relay and said valving means for applying a hydraulic signal pressure to said valving means in proportion to an applied pneumatic signal pressure.

8. The combination according to claim 7 in which said valving means constitutes a flexible conduit valve coupled to said discharge outlet for defining a fluid flow orifice of a cross-section inversely proportional to applied hydraulic pressure.

References Cited

UNITED STATES PATENTS

| | | | |
|---|---|---|---|
| 1,851,422 | 3/1932 | Durando | 137—395 |
| 2,520,660 | 8/1950 | Sedgwick | 251—57 X |
| 2,904,063 | 9/1959 | Wall et al. | 137—392 |
| 2,988,099 | 6/1961 | Langhans | 137—403 X |
| 3,074,277 | 1/1963 | Hill | 73—439 |
| 3,136,333 | 6/1964 | Griswold | 251—29 X |

FOREIGN PATENTS 114,856   4/1918   Great Britain.

WILLIAM F. O'DEA, *Primary Examiner.*

D. R. MATTHEWS, *Assistant Examiner.*